Figure 1:
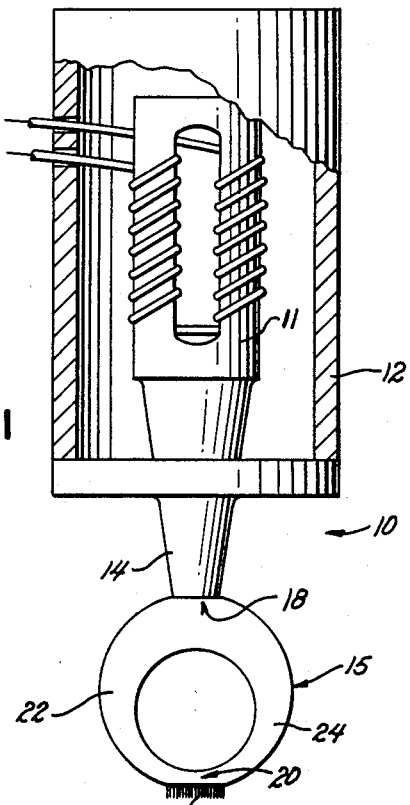

Jan. 9, 1962    R. N. RONEY    3,015,961

MACHINE COMPONENT

Filed May 2, 1960

INVENTOR
Richard N. Roney
BY
Ernest J. Hix
ATTORNEY

United States Patent Office 3,015,961
Patented Jan. 9, 1962

3,015,961
MACHINE COMPONENT
Richard N. Roney, Dayton, Ohio, assignor to The Sheffield Corporation, Dayton, Ohio, a corporation of Delaware
Filed May 2, 1960, Ser. No. 25,946
7 Claims. (Cl. 74—1)

This invention relates to ultrasonic vibration apparatus and more particularly to an improved motion converting member for use in ultrasonic driving assemblies.

In ultrasonic vibratory driving assemblies whether applied to cleaning, machining or other uses, an energy transducing or motion converting member is commonly used to obtain the required amplitude conversion and transmission of vibratory energy between the energy source and energy applying means. In ultrasonic machining, for example, motion converting members between magnetostrictive or piezoelectric energy sources and the forming tool are conformed to obtain amplified amplitude of tool movement at the working area. Prior known converting members of this nature have had configurations which are difficult and expensive to design and manufacture and which are, in most instances, overly bulky in design. Also these known members offer problems in efficiency of energy transmission and tool attachment.

It is accordingly an object of this invention to provide a motion converting member for receiving and transmitting energy in an ultrasonic driving assembly, which member is economical to manufacture and offers advantages in efficiency of operation.

It is a further object to provide such a motion converting member which, in a single integral unit, provides a pair of energy transmitting arms having curved axes which relatively diverge outward from an input coupling portion and converge inwardly to an output portion where the energy is applied, whereby axial compactness and rigidity of the coupling member is obtained.

It is a further object to provide such a member where the curved transmitting arms are integrally provided between the input and output member portions by inner and outer circular peripheries which are relatively eccentric in the direction of transmission and along the axis of the ultrasonic assembly, thus providing curved energy transmitting and amplitude amplifying arms of tapered configuration between the coupling portions.

It is a further object to provide a member as referred to above having integral curved vibratory transmitting arms wherein the profile of the arms in a plane transverse the plane of curvature tapers from a major transverse dimension adjacent the input portion of the member to a minor dimension adjacent its output portion, to thus provide amplitude amplification as well as energy transmission in a compact, economically manufactured member.

It is a further object to provide such a converting member having curved transmission arms relatively diverging and converging, wherein tool coupling means extend through the output portion thereof to give accessibility for tool attachment and adjustment, and also making it possible to provide support for a tool extending through that portion for adjustment therein to compensate for tool wear.

Figure 3:
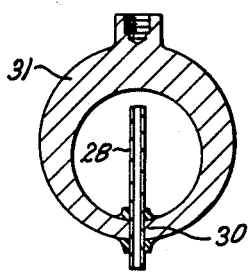
Figure 2:
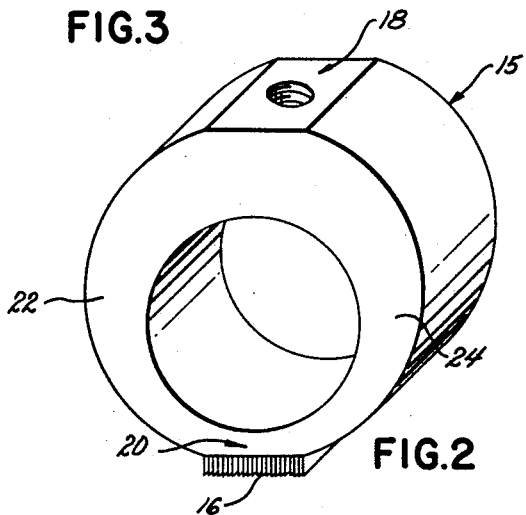
Figure 4:
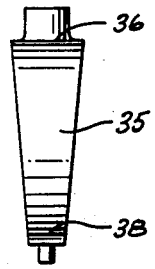

Other objects and advantages of the invention will be apparent from the following description, the appended claims, and the accompanying drawing, in which, FIGURE 1 illustrates in partial section an ultrasonic driving assembly including a motion converting member embodying features of the present invention, FIGURE 2 is a perspective illustration of the motion converting member included in the assembly of FIGURE 1, FIGURE 3 is a central sectional illustration of a modified converting member, having a forming tool extending through the output portion thereof, and FIGURE 4 is a side view of a modified transmitting member tapered in a transverse plane.

A particular application of the present invention to ultrasonic machining as well as modified forms of exemplary motion converting members embodying the invention, are illustrated and will now be described. It will be understood that the present invention is not limited to this application or to the particular forms shown in the drawings.

In FIGURE 1 the ultrasonic driving assembly 10 includes a magnetostrictive source of ultrasonic vibratory energy 11 of known construction and operation. Source 11 is enclosed in housing 12 and is connected through unit 14 and member 15 to an energy applying means shown as a slicing tool 16 in this exemplary application.

Upon energization of magnetostrictive source 11 in a known manner the vibratory energy will be transmitted and amplified, resulting in vibration of tool 16 through a minute amplitude at ultrasonic frequencies while applied at a working area flooded with an abrasive slurry, Patent 2,791,066 issued May 7, 1957 illustrates and describes the process in more detail. Housing 12 is adapted for mounting for vertical movement on a tool head of a machine for adjustment relative to a workpiece carried on the table thereof.

The motion converting member 15 which embodies the present invention is illustrated more particularly in the perspective view of FIGURE 2. Member 15 is integrally formed and is symmetrical relative to the longitudinal axis of assembly 10. It has an input coupling portion at 18 which can be modified for applications as desired and an output coupling portion 20 which is modified to suitably mount the particular forming tool. As shown, input coupling portion 18 is provided for connection to the energy source 11 and output coupling portion 20 to the energy applying means which is illustrated in the form of machining tool 16. Other applying means will occur to those skilled in the art. As examples, output coupling portion 20 could be connected to a suitable cleaning tank or to a terapeutic device.

Motion transmitting arms 22 and 24 extend integrally between coupling portion 18 and 20. These arms have curved axes which relatively diverge outward from portion 18 and converge to portion 20, thus integrally providing dual vibration transmitting arms at each side of member 15. This lessens the overall axial extent required of member 15, thus providing an exteremely compact motion converting member with improved rigidity.

The input and output coupling portions 18 and 20 are at the extremities of the member along the axis of assembly 10. The projected major configuration of the member in a plane including that axis is defined by inner and outer circular peripheries. The inner of said peripheries defines a circular hole through member 15 which is eccentric to the outer periphery along the axis of assembly 10 toward the output coupling portion 20. Therefore, the output coupling portion 20 will be of minimum cross-sectional area to thereby provide maximum amplitude amplification of the vibratory energy. Thus, in an extremely economical and simple manufacturing process, dual vibration transmitting and amplitude amplifying portions of tapering cross-sectional area are provided at each side of the member extending between portions 18 and 20. Complex turning operations and intricate development are avoided and efficient transmission and amplification of vibratory energy is made possible in a most simple of shapes to manufacture.

The mass of the member compared to known members previously provided for similar purposes is considerably less. Also the surface area of the member of this invention relative to the mass thereof is greater than that of prior known members, thus providing increased heat dissipation area for better operation. Similarly, where tools are brazed to the member less heat and time for the opreation is required than previously because of the reduced heat absorbing mass of the motion converting member employed, which results from the unique configuration provided through the teachings of the present invention.

Where desired, the peripheral edges of member 15 can be rounded or filleted. However, in most applications the member 15 is basically formed of a single rectangular piece of metal with inner and outer circular cuts.

The motion converting member of the present invention has further advantages in tool attachment, rendering the tool accessible from the end thereof remote from the forming area. An exemplary application of this is illustrated in FIGURE 3 where an elongated tubular tool 28 passes through the output coupling portion 30 of holder 31. As seen in this figure output coupling portion 30 is suitably filleted and tool 28 is brazed or soldered therein. In this instance, when the tool is shortened beyond allowable limits due to wear in machining the soldering connection between it and output coupling portion 30 can be easily melted, the tool 28 readjusted, and the connection resoldered. Because the tool can pass through the output coupling portion, mechanical attachments, making possible rapid and simple adjustment, can also be provided. For example, tool 28 could be externally threaded within portion 30 and held in position by nuts threaded thereon and engaging the upper and lower surfaces of portion 30 for clamping. Where it is desired, a tool such as that indicated at 28 can be provided which is hollow, with a coupling to an abrasive supply at its end remote from the forming area so that the area can be flooded with an abrasive slurry passed through the tool. This provides increased efficiencies in forming in some instances.

For amplitude conversion or increase a tapered configuration of the motion transmitting member is required In FIGURES 1 and 2 both arms 22 and 24 are tapered due to the eccentricity of the circular peripheries which are simply obtained in machining. In FIGURE 4 an exemplary motion transmitting member 35 is shown in a projected outline in a plane transverse the plane of the transmitting arms and including the assembly axis. In this instance member 35 tapers from a major transverse dimension at the input portion as indicated at 36 to a minor dimension adjacent the output portion as indicated at 38. This tapering of the transmitting arms is also most economically achieved in manufacture and is efficient and effective in application.

Thus it is seen that a motion transmitting and converting member is provided for use in ultrasonic driving assemblies which has material advantages in economy of manufacture and compactness of configuration over those of prior known devices. Increased efficiencies of application are possible and advantages in tool attachment and adjustment are achieved.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A motion converting member for use in an ultrasonic driving assembly for receiving vibratory energy at ultrasonic frequencies and transmitting said energy with amplified amplitude at the same frequency to an energy applying means of the assembly, said member being integrally formed, symmetrical relative to the longitudinal axis of the assembly, and having input and output coupling portions at its extremes along said axis for respective connection to an energy source and an energy applying means, the projected major configuration of said member in a plane including said axis being defined by inner and outer circular peripheries, the inner of said peripheries defining a circular hole through said member to provide dual vibration transmitting arms at each side thereof terminating in a portion of minimum cross-sectional area for defining said output coupling portion.

2. A motion converting member as set forth in claim 1 wherein the projected outline of said member in a plane transverse the plane of said arms and including the assembly axis tapers from a major transverse dimension adjacent said input portion to a minor dimension adjacent said output portion to provide amplitude amplification between said energy source and said applying means.

3. A motion converting member for use in an ultrasonic driving assembly for receiving vibratory energy at ultrasonic frequencies and transmitting said energy with amplified amplitude at the same frequency to an energy applying means of the assembly, said member being integrally formed, symmetrical relative to the longitudinal axis of the assembly, and having input and output coupling portions at its extremes along said axis for respective connection to an energy source and an energy applying means, the projected major configuration of said member in a plane including said axis being defined by inner and outer substantially circular peripheries, the inner of said peripheries defining a circular hole through said member eccentric to the outer periphery along said axis in the direction of said output coupling portion to provide dual vibration transmitting and amplitude amplifying portions of tapering cross-sectional area at each side thereof terminating in a portion of minimum cross-sectional area for defining said output coupling portion.

4. A motion coverting member as set forth in claim 3 wherein said output coupling portion includes means for supporting an energy applying tool coaxial with the axis of the assembly, said coupling means being accessible from within the circular hole through said member.

5. A motion converting member as set forth in claim 3 wherein said output coupling portion has an opening extending therethrough along the axis of said assembly, an energy applying tool, and means supporting said tool in said opening.

6. A motion converting member for use in an ultrasonic driving assembly for receiving vibratory energy at ultrasonic frequencies and transmitting said energy to an energy applying means of the assembly, said member being integrally formed and symmetrical relative to the longitudinal axis of the assembly, and having an input coupling portion adapted for connection to an energy source, said member including motion transmitting arms extending from said input coupling portion, said arms having convexly curved axes converging and uniting at the lower ends thereof to form a generally circular output coupling portion of minimum cross-sectional area adapted for connection to said energy applying means for providing amplitude amplification between said coupling portions.

7. A motion converting member for use in an ultrasonic driving assembly for receiving vibratory energy at ultrasonic frequencies and transmitting said energy to an energy applying means of the assembly, said member being integrally formed and symmetrical relative to the longitudinal axis of the assembly and having an input coupling portion adapted for connection to an energy source, said member including motion transmitting arms extending from said input coupling portion, said arms having axes curving generally outwardly from one another adjacent said input coupling portion and generally towards one another at the lower ends thereof for uniting to form a generally circular output coupling portion adapted for connection to said energy applying means, said arms being of maximum cross-sectional area adjacent said input coupling portion and gradually tapering to minimum cross-sectional area at said output coupling portion for maximum energy amplitude amplification.

References Cited in the file of this patent
UNITED STATES PATENTS
2,723,386   Camp ---------------- Nov. 8, 1955